Feb. 11, 1969 H. P. MANNING ETAL 3,427,648
MISSILES AND GUN BARRELS FOR ELIMINATING SABOTS THEREFROM
Filed Nov. 3, 1958
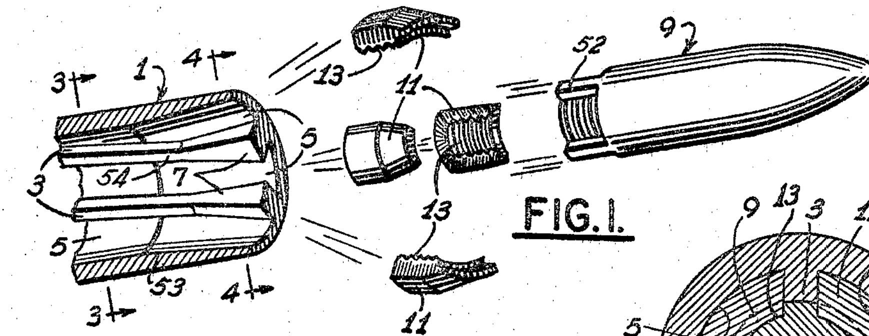
FIG. 1.
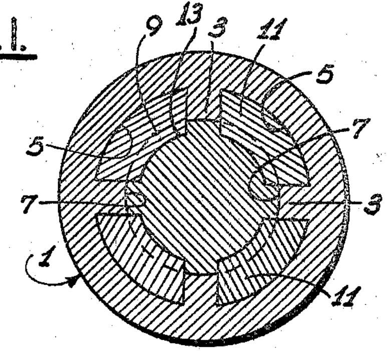
FIG. 3.
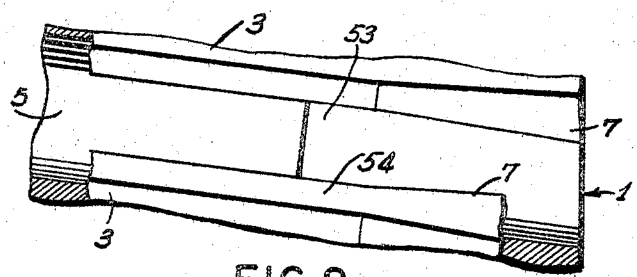
FIG. 2.
FIG. 4.
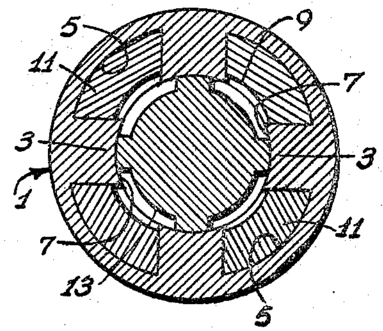
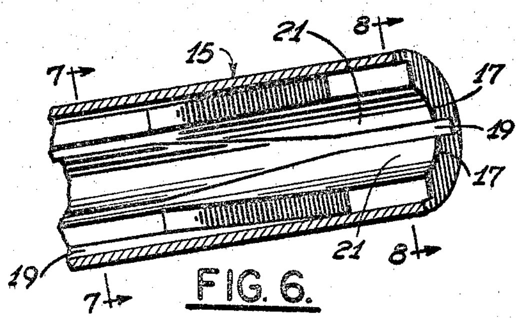
FIG. 6.
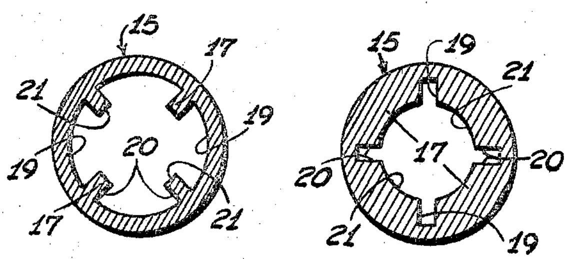
FIG. 7.
FIG. 8.
FIG. 5.
INVENTOR.
HENRY P. MANNING
C WALTON MUSSER
BY
W. E. Thibodeau, A. W. Dew
and H. I. Forman
ATTORNEYS:

MISSILES AND GUN BARRELS FOR ELIMINATING SABOTS THEREFROM

Filed Nov. 3, 1958

INVENTOR.
HENRY P. MANNING
C WALTON MUSSER
BY
W. E. Thibodeau, A. W. Dew
and H. I. Forman
ATTORNEYS:

United States Patent Office 3,427,648
Patented Feb. 11, 1969

3,427,648

MISSILES AND GUN BARRELS FOR ELIMINATING SABOTS THEREFROM

Henry P. Manning, 877 W. Maple Drive, Southampton, Pa. 18966, and C Walton Musser, 66 McKay St., Beverly, Mass. 01915

Continuation-in-part of application Ser. No. 357,648, May 26, 1953. This application Nov. 3, 1958, Ser. No. 771,682
U.S. Cl. 102—93 2 Claims
Int. Cl. F42b *31/00, 13/16*

The invention described herein may be manufactured and used by or for the Government for governmental purposes without the payment to us of any royalty thereon.

This application is a continuation-in-part of our application for "Missiles and Gun Barrels for Eliminating Sabots Therefrom," Ser. No. 357,648, filed May 26, 1953, now abandoned.

The present invention relates to weapon systems comprising special rifling and projectiles adapted therefor, wherein higher velocity and greater accuracy of the projectile may be achieved by obtaining sabot discard where it will not affect projectile launching and has for an object an improved method of launching a projectile at a high velocity and with a high degree of uniformity so that greater accuracy may be obtained.

The prior art has employed sabots for achieving low sectional density in the gun or rifle tube, discarding or stripping the sabot at or after launching, thereby achieving a high sectional density in flight, thus achieving the shortest possible time of flight. Prior art difficulties with sabot projectiles have been in the launching area. The sabot segments are normally discarded after the projectile is launched, when the projectile is in the muzzle blast area. Under these circumstances, it is rarely possible to have the sabot segments discard uniformly for a series of rounds. Thus, an inherently accurate projectile is diverted from its true path by non-uniform sabot discard causing high velocity muzzle gases to sweep by the projectile in a non-uniform manner, causing a variation in pressure from one side of the projectile to the other, the pressure differential thereby causing it to move from its intended path. If the sabot segments are sheared off at the muzzle, the projectile is retarded in its forward motion, as well as being limited in the thickness of the segments, and thus, the pressure at which the projectile may be fired, thereby slowing the projectile.

We have overcome the prior art difficulties, by presenting a unique way of obtaining high projectile accuracy by devising means whereby the projectile is continuously guided before, during and after sabot discard, while at the same time not retarding the projectile in its forward motion, thereby obtaining more nearly uniform launching from round to round and maintaining a high launching velocity. We achieve the improved launching by designing the gun rifling such that the lands support the main body of the projectile throughout its travel, and the grooves are of a greater than usual depth to allow for the increase in radial thickness of the sabot, and extend the greater portion of the length of the tube. Near the mouth of the tube, the grooves become deeper to allow for radial separation of the sabot segments by centrifugal force, then the grooves narrow to retard the separated sabot segments, thereby permitting the projectile to proceed without being retarded, the projectile body still being supported by the lands of the rifling until launched and not thereafter subject to mechanical contact with the gun; then, the retarded sabot segments leave the gun tube somewhat behind the projectile, and cause no gas disturbance at the muzzle. There is no question that the sabot segments will separate radially outwardly by centrifugal force when the grooves get deeper, since a high rotation is used to stabilize a spin stabilized projectile (about 15,000 r.p.m. for a 105 mm. projectile), and some spin is desirable for a fin stabilized projectile (about 900 r.p.m. for a 105 mm. projectile) to allow for eccentricities introduced during manufacture. Although the grooves are narrowed to retard the sabot segments, they will naturally leave the gun after the projectile since they have to travel radially outward as well as forward, while the projectile is traveling forward.

The features of the present invention may be better understood from the following description of three embodiments, when read in connection with the accompanying drawings wherein similar reference characters have been used to designate corresponding parts throughout, and in which:

FIG. 1 is a composite perspective view of a portion of a gun tube adjacent the muzzle indicating the deeper rifling grooves, the widening lands (narrowing grooves) and a spin stabilized projectile being launched with the sabot segments somewhat behind;

FIG. 2 is an enlarged sectional view of the gun tube adjacent the muzzle showing the deepening of the grooves and widening of the lands;

FIG. 3 is an enlarged sectional view of the barrel shown in FIG. 1 taken along the line 3—3 through the sabot segments of a spin-stabilized projectile, before the grooves deepen, looking towards the muzzle of the gun;

FIG. 4 is a view similar to FIG. 3, taken along the line 4—4 through the sabot segments of a spin stabilized projectile, after the grooves deepen, and just as the sabot segments are being retarded by the widening of the lands looking towards the muzzle of the gun;

FIG. 5 is a view of the rear portion of a spin stabilized projectile, showing a partial section of a sabot segment and attaching means for securing it to the projectile during travel through the major portion of the gun tube;

FIG. 6 is a perspective view of a portion of a gun tube which accommodates a second embodiment;

FIG. 7 is a cross section of the gun tube taken along the line 7—7, before the lands widen;

FIG. 8 is a cross section of the gun tube taken along the line 8—8, after the lands widen;

Figure 9:
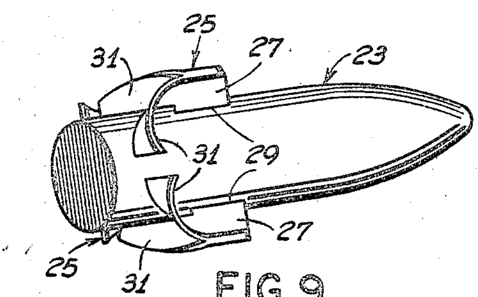
FIG. 9 is a perspective view of a fin stabilized projectile which uses its own fin blades as the sabot means.

In the usual spin stabilized projectile, a soft metal rotating band is used to impart spin, by engraving and following the helical rifling of the gun tube. In our first embodiment is shown a spin stabilized projectile 9 having sabot segments 11 adapted to fit in the rifling grooves 5 between the rifling lands 3 of a gun tube 1, in such a manner that when the projectile is fired the sabot segments cause the projectile to follow the twist of the rifling thereby inducing the spin necessary to stabilize the projectile in flight and fit tightly enough to prevent gas blow-by. The projectile body is undercut at the rear to accommodate the sabot segments, having body diameter 52 for the segments to bear against, thereby causing the projectile to spin. A projection and recess type connection 13 is employed to prevent longitudinal movement during handling, and some retaining or attaching means such as a rubber band, 55, is used to hold the sabot segments from radial outward movement during handling and loading only, and is ruptured immediately upon firing.

In order to obtain sabot discard without adversely affecting launching of the projectile, some minor distance, about 5–15% back from the muzzle of the gun tube, the grooves are deepened 53 allowing the sabot segments 11 to separate from the projectile 9 disengaging the projection and recess type connection 13, while the lands remain of constant width. Thereafter, the grooves 5 continue to deepen and the lands 3 widen sufficiently to retard the segments such that the projectile emerges first, with the segments emerging behind, thereby preventing unsymmetrical pressure distribution which usually occurs where the sabot segments are discarded after the projectile is launched; and the projectile is not retarded, as when the sabot is stripped off at launching; more nearly uniform launching being achieved due to the fact that the projectile continues to be guided before, during and after sabot discard. The projectile body is supported by the faces of the lands 7 throughout its entire travel in the tube. The grooves 5 should have a maximum cross-sectional area to be most effective.

Figure 10:
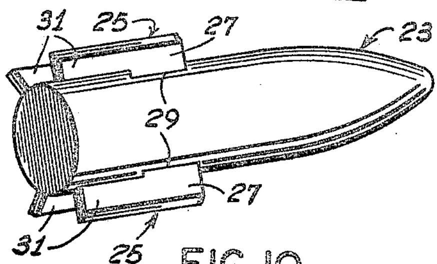
FIG. 10 is a perspective view of the projectile in FIG. 9 after emerging from the gun tube.

The present invention is also applicable to a straight, deep rifled barrel useful in firing fin stabilized missiles. A preferred embodiment thereof is illustrated in FIGS. 6 through 10 of the drawings wherein a portion of the rifling is emploeyd to transform sabot means comprising part of the stabilizing fins to meet free flight stabilizing requirements prior to the missile being ejected from the tube, of the weapon. FIG. 6 shows the forward portion 15 of a gun tube useful in firing fin stabilized missiles and which comprises a tubular member having a central bore of predetermined caliber extending longitudinally therethrough. The internal wall of the tube is deeply rifled to provide a plurality of splines 17 and grooves 19 for accommodating the stabilizing fins of the missiles. A first major portion of the barrel including the chamber end thereof is arranged to provide each groove with a maximum practicable cross section area for accommodating the sabot means of the missile. In other words, the total cross section area of the grooves in this first portion should be designed to provide the maximum, practicable driving area for the missile. A cross section of a preferred embodiment of a barrel which will fulfill this requirement is illustrated in FIG. 7 of the drawings and may generally be described as being similar to a Maltese cross. However, this configuration is not controlling for the purposes of the present invention and the grooves may be rectangular or some other design suitable to meet ballistic requirements or to facilitate manufacture.

The second, adjoining portion of the barrel extending to the muzzle end thereof has the rifling arranged so that opposite walls 20 of the grooves 19 converge to decrease the width of the groove. In this embodiment, the depth of the groove remains the same throughout both portions of the barrel. The arcuate faces 21 of the splines or lands remain parallel to and equidistant from the bore axis throughout the barrel length and are disposed at a distance from the axis of the barrel sufficient to accommodate a missile of given caliber.

The fin stabilized missile 23 is of a design suitable to meet ballistic requirements. Generally, it comprises a cylindrical body member of given caliber having a plurality of plate-like stabilizing fins 25 attached to the outer surface thereof at spaced intervals. The number of fins and the spacing thereof corresponds to the grooves provided in the barrel. Each fin 25 generally comprises a first, forwardly disposed portion 27 which is attached along an edge 29 thereof to the body of the missile and extends laterally or radially outwardly therefrom. The second portion 31 of each fin extends rearwardly from the first portion and is bifurcated to provide separate portions with the ends thereof flaring outwardly. The divergent portions 31 are arranged, first, to function as sabot members while within the first portion of the barrel and, second, subsequent to being converted, to fulfill a fin stabilizing function. The fins should be made from a sufficiently ductile material as to be deformable and should be arranged in a manner somewhat similar to that shown in FIG. 9 of the drawings so that their edges will intimately engage the barrel surfaces defining the grooves. With the rearwardly extending fin portions arranged in this manner, the missile is provided with a larger than normal driving area and hence the sectional density of the missile while within the barrel is reduced proportionately.

In operation, as the missile is propelled through the first portion of the barrel, the divergent fin portions 31 being intimately engaged with the walls of the rifling effect a gas check or seal therewith to prevent the forward escape of propellant expanding gases. Thus, as in the first described embodiment, the effective driving area of the missile is increased by the total driving area provided by the sabot-like fin portions 31. After traversing the first portion of the barrel, the converging walls 20 of the splines 17 transform the diverging portions of the fins into flat planar portions lying adjacent to each other. Thus, the divergent portions which are an integral part of each stabilizing fin will be transformed by the weapon barrel prior to emergence therefrom in a manner such that they will have a minimum effect upon velocity loss during free flight of the missile.

Figure 11:
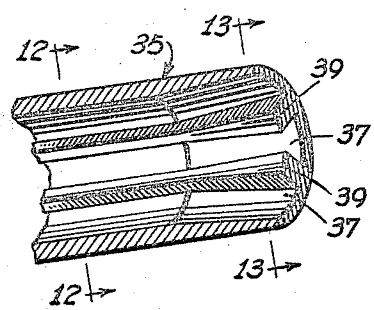
FIG. 11 is a perspective view of another gun tube, to accommodate a fin stabilized projectile.
Figure 12:
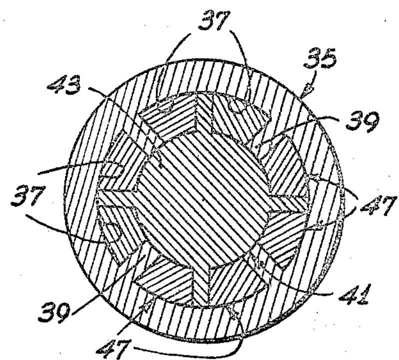
FIG. 12 is an enlarged cross section view of the gun tube taken along the line 12—12, through the sabot segments before the grooves deepen and the lands widen, looking into the muzzle of the gun.
Figure 14:
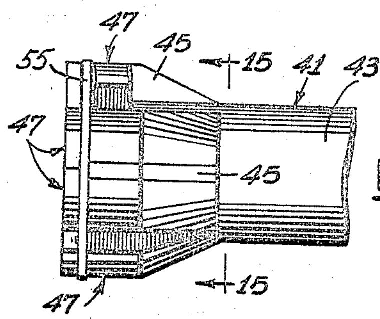
FIG. 14 is a side elevation of a fin stabilized missile designed to be launched from the gun tube in FIG. 11.
Figure 13:
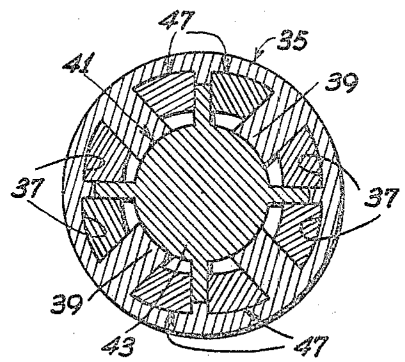
FIG. 13 is an enlarged cross section view of the gun tube taken along the line 13—13, through the sabot segments, after the grooves deepen and the lands widen, looking into the muzle of the gun.
Figure 16:
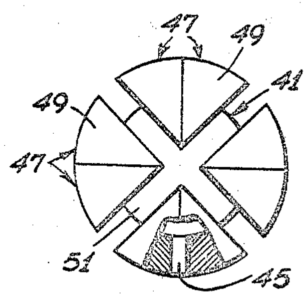
FIG. 16 is a rear view of the projectile shown in FIG. 14.
Figure 15:
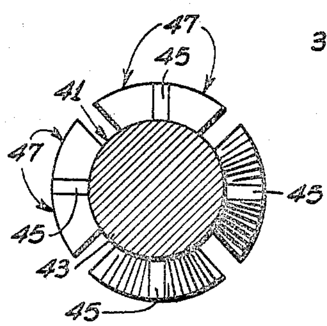
FIG. 15 is a front sectional view of the fin stabilized projectile shown in FIG. 14, taken along the line 15—15.

The third embodiment (FIGS. 11 through 16) shows a fin stabilized projectile with detachable sabot segments. The gun tube 35 has rifling with a helical twist which will impart a spin of about 15–25 revolutions per second to the projectile.

The principle of the detachable sabot members for this embodiment is the same as that employed for the first described embodiment. Therefore, the cross section of the respective rifling grooves 37 is similar to that shown and described for the first embodiment. Thus, it will be observed that the deep rifling of the tube throughout a first major portion thereof from the chamber end is of uniform cross section which is generally described as similar to a Maltese cross. The adjoining second portion to the muzzle end of the tube comprises the sabot removing portion which is arranged to divert the sabot members in a radial direction outwardly. As in the first described embodiment, the grooves 37 in the second portion thereof to the muzzle end of the barrel are gradually deepened to allow centrifugal force to detach the segments, then the lands or splines 39 are widened in a manner to retard the sabot members allowing the projectile to emerge before the sabot segments. The groove width at the point where it adjoins the bore will be observed to become narrower in the second portion thereof as it approaches the muzzle end, as particularly shown by a comparison of the cross sectional views shown in FIGS. 12 and 13.

The fin stabilized missile 41 is of a conventional type and of a caliber to fit the bore of the gun tube 35. Generally, the missile comprises a cylindrical body member 43 having a plurality of plate-like stabilizing fins 45 attached adjacent the rear portion along the outer surface thereof at circumferentially spaced apart intervals. The number of fins corresponds to the number of grooves 37 provided in the barrel rifling.

A pair of sabot members 47 of lightweight material is provided for each of the fins 45, the respective sabot members of each pair being mounted on opposite sides of the fin, in the manner indicated particularly in FIG.

15 of the drawings. The sabot members are in close contact with the fins and are of a cross section configuration such that the fins will intimately engage the rifling surfaces defining the grooves in the first portion of the barrel. Each sabot member comprises a longitudinal member somewhat corresponding in longitudinal cross section to the fins of the missile. A shoulder portion 49 is provided as an extension of the rear part of the sabot member which extends behind the base 51 of the missile when mounted thereon. The shoulder portion of each sabot member which extends rearwardly of the fin is arranged to extend in back of the fin an amount sufficient to abut with a corresponding extension provided on its counterpart, in the manner illustrated in FIG. 16 of the drawings. This latter construction is not necessary to carry out the purposes of the present invention but may be varied in accordance with structural requirements keeping in mind a design which will effect the most efficient fluid tight seal to prevent the escape of propellant gases. For example, the sabot members useful in conjunction with the respective stabilizing fins may comprise a single, bifurcated member having a central, longitudinal slot for receiving the fin, or it may comprise a single member disposed on but one side of the fin.

The fin stabilized missile 41 which is provided with detachable sabot member 47 will be found to operate as follows. As the missile is propelled through the first portion of the tube, the sabot members disposed on opposite sides of each stabilizing fin are in intimate contact with the walls defining the rifling grooves. Thus, the effective driving area of the missile is increased by the total driving areas of the sabot members. As the missile travels through the second portion of the barrel, the centrifugal force will initially cause the sabot segments to be disengaged from the projectile, then the rifling grooves will divert the sabot segments in a radial direction outwardly from the main body 43 of the missile and retard them prior to the missile emerging from the barrel. In other words, the sectional density of the missile is increased to its normal free flight characteristic prior to emergence from the barrel.

Those skilled in the art will be quick to realize that we have presented a system for achieving improved accuracy with ammunition using increased cross sectional area in the gun tube for achieving high velocities, by obtaining more nearly uniform launching of rounds.

We claim:

1. A combination of a weapon barrel and a projectile adapted to be fired through the weapon barrel, said projectile having a body portion and sabot segments, said sabot segments having a diameter greater than said body portion; means for retaining said sabot segments in contact with said projectile prior to and during insertion into the weapon barrel; helical lands and grooves in said barrel, with said grooves having a depth to receive the extension in radial length possessed by said segments beyond the radius of said body portion; said lands having a radial inner surface of constant diameter extending the full length of the barrel and supporting said body portion of the projectile; a projection and recess type connection between each segment and the projectile; the base of said grooves cooperating with said segments to restrain said segments against radial outward movement; about 5–15% of the length of said barrel adjacent its muzzle having said barrel grooves of greater depth than the remainder of said barrel grooves by an amount greater than the depth of said projection and recess type connection to allow for centrifugal separation of said segments away from the projectile without retarding the forward movement of the projectile; the projectile being in contact with said helical land's radial inner surface, said projectile thereby being guided and supported throughout the entire forward movement within said barrel, including that forward movement after separation of said segments from said projectile.

2. A combination as in claim 1 wherein said grooves adjacent the muzzle of said barrel are narrowed in a direction toward the muzzle of said barrel to exert increased friction upon separated segments and retard their forward movement so that said segments are ejected from the barrel behind the projectile.

References Cited

UNITED STATES PATENTS

| | | | |
|---|---|---|---|
| 804,483 | 11/1905 | Lincoln | 42—78 |
| 868,938 | 10/1907 | Puff | 102—93 |
| 1,341,844 | 6/1920 | Dougan | 102—51 |
| 1,777,771 | 10/1930 | Scherf | 42—78 |
| 2,115,028 | 4/1938 | Logan | 102—92.5 |
| 2,306,140 | 12/1942 | Reed | 102—93 |
| 2,089,219 | 8/1937 | Moore | 42—78 |
| 2,382,152 | 8/1945 | Jakobsson | 102—93 |

FOREIGN PATENTS

| | | |
|---|---|---|
| 13,114 | 1901 | Great Britain. |
| 66,446 | 3/1948 | Denmark. |

BENJAMIN A. BORCHELT, *Primary Examiner.*

JAMES FOX, *Assistant Examiner.*

U.S. Cl. X.R.

42—78